United States Patent [19]
Eger

[11] 3,774,949
[45] Nov. 27, 1973

[54] COLLAPSIBLE TOW BAR

[76] Inventor: Mathias Eger, 3418 5th Ave. South, Fort Dodge, Iowa 50501

[22] Filed: June 20, 1972

[21] Appl. No.: 264,536

[52] U.S. Cl................ 293/69, 280/491 D, 280/500
[51] Int. Cl.............................................. B60d 1/16
[58] Field of Search.......................... 280/491, 500; 293/69 R

[56] References Cited
UNITED STATES PATENTS

| 3,480,296 | 11/1969 | Starling | 293/69 R X |
| 3,147,027 | 9/1964 | Bronleewe | 280/491 D R |
| 2,995,386 | 8/1961 | Peterson | 280/491 D R |
| 3,449,850 | 9/1948 | Huhle | 293/69 R |

*Primary Examiner*—Leo Friaglia
*Assistant Examiner*—Randall A. Schrecengost
*Attorney*—Zarley et al.

[57] ABSTRACT

A collapsible tow bar for a vehicle is disclosed herein and generally comprises a hollow bumper having the collapsible tow bar secured thereto and stored therein when not in use. The bumper has a central opening which is selectively closed by a cover element. First and second spaced apart support rods are secured to the bumper within the bumper adjacent the opposite ends thereof. First and second tow bar members are rotatably and slidably secured at one of their ends to the first and second support rods respectively. The first and second tow bar members may be slidably moved inwardly on the support rods to permit their other ends to be extended outwardly of the central opening in the bumper. The other ends of the first and second tow bar members are adapted to be secured together and are adapted to have a tongue member detachably secured thereto.

4 Claims, 7 Drawing Figures

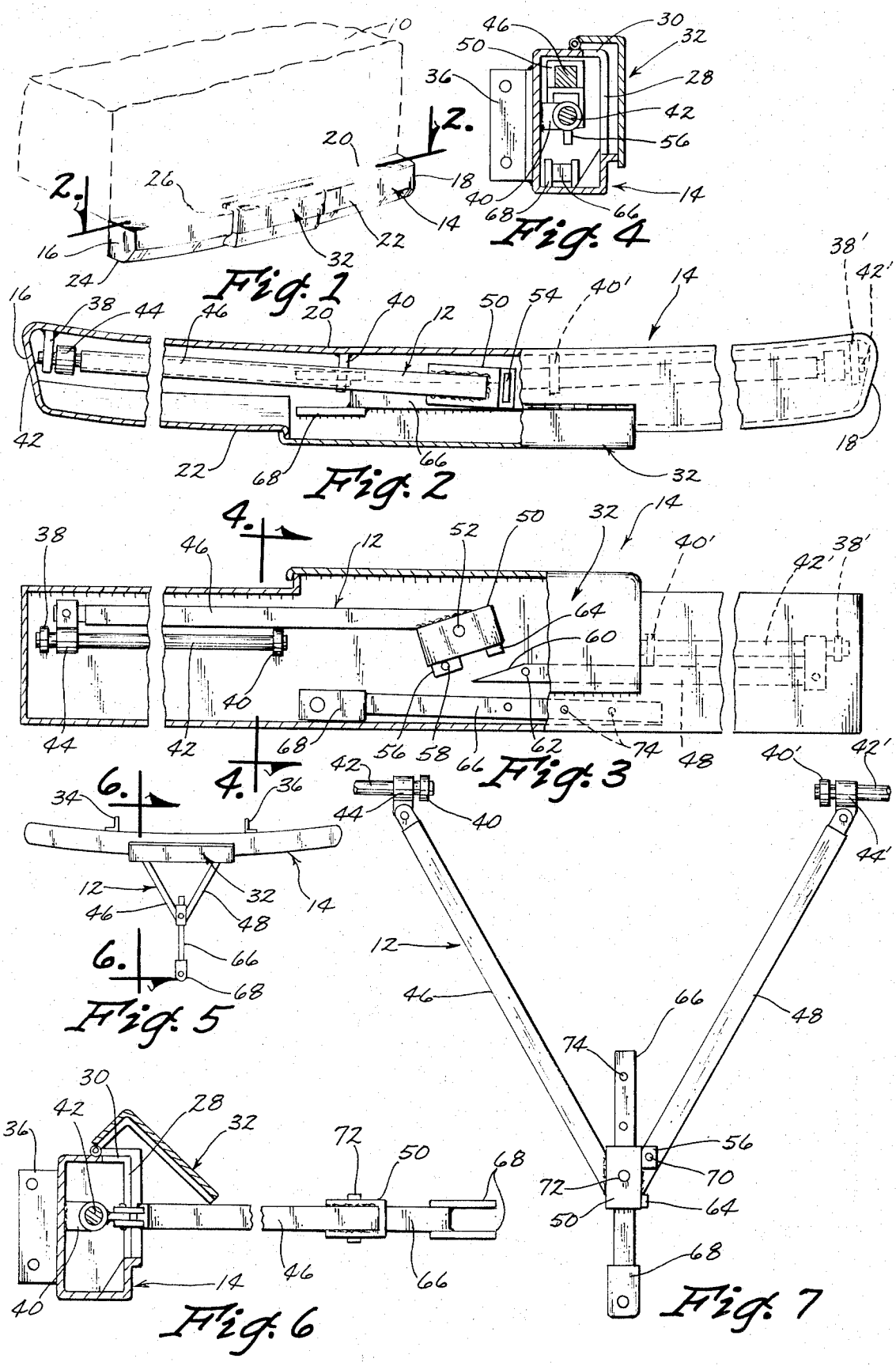

COLLAPSIBLE TOW BAR

Tow bars are commonly used to tow one vehicle behind the other. The conventional tow bars generally comprise a V-shaped member which is pivotally connected at its ends to the front bumper of the vehicle to be towed. A tongue element is ordinarily secured to the apex of the V-shaped member and is secured to the towing vehicle when the towing operation is to be performed. When the towed vehicle is not being towed, a problem is encountered in storing the tow bar secured to the front bumper thereof. The tow bar must either be removed from the front bumper or must be secured in an upright position so that it does not interfere with the normal operation of the vehicle.

Therefore, it is a principal object of this invention to provide an improved tow bar.

A further object of this invention is to provide a collapsible tow bar.

A still further object of this invention is to provide a collapsible tow bar which is stored within a hollow bumper when not in use.

A still further object of this invention is to provide a collapsible tow bar which occupies a minimum of space when not in use.

A still further object of this invention is to provide a collapsible tow bar which is quickly assembled and disassembled.

A still further object of this invention is to provide a collapsible tow bar which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a front perspective view of a hollow bumper mounted on the front end of a mobile trailer or the like:

FIG. 2 is a fragmentary sectional view seen along lines 2—2 of FIG. 1:

FIG. 3 is a fragmentary rear view of the bumper and tow bar therein with portions thereof cut away to more fully illustrate the invention:

FIG. 4 is a sectional view seen along lines 4—4 of FIG. 3:

FIG. 5 is a top view of the bumper with the collapsible tow bar extending therefrom:

FIG. 6 is an enlarged fragmentary sectional view seen along lines 6—6 of FIG. 5; and FIG. 7 is a top view of the tow bar in its assembled condition.

The numeral 10 refers generally to a pickup truck or the like having the device of this invention mounted at the rear end thereof. The collapsible tow bar of this invention is referred to generally by the reference numeral 12 while the reference numeral 14 refers to the hollow bumper in which the tow bar is stored when not in use. For purposes of description, the bumper 14 will be described as having ends 16 and 18, front wall 20, rear wall 22, bottom 24 and top 26. Bumper 14 has a central opening 28 formed in rear wall 22 and a central opening 30 formed in top 26 which communicates with the central opening 28. The central openings 28 and 30 are selectively closed by a cover element 32 which is pivotally connected at its upper forward end to top 26.

The bumper 14 is secured to the truck 10 by means of the bumper brackets 34 and 36.

A pair of ears 38 and 40 are secured to the inside surface of front wall 20 and extend rearwardly therefrom as illustrated in the drawings. A support rod 42 is secured to and extends between the ears 38 and 40 as illustrated in FIG. 3. Likewise, a pair of ears 38' and 40' are secured to the inside surface of back wall 20 and extend forwardly therefrom as illustrated in FIG. 2. A support rod 42' is secured to and extends between the ears 38' and 40'.

Collar 44 is rotatably and slidably mounted on the rod 42 and has one end of a tow bar member 46 pivotally secured thereto. A collar 44' is rotatably and slidably mounted on the support rod 42' and has one end of a tow bar member 48 pivotally secured thereto as illustrated in FIG. 7. Tow bar member 46 has a hollow tubular member 50 secured to the other end thereof which has an opening 52 formed therein. The opening 54 extending through the tubular member 50 may be either rectangular or square depending upon the configuration of the tongue member to be described hereinafter. Ear 56 is secured to the tubular member 50 and extends laterally therefrom and has an opening 58 provided therein. Tow bar member 46 has a tapered rearward end 60 having an opening 62 extending therethrough. Tubular portion 50 is provided with a small channel portion 64 which is adapted to receive the extreme rearward end of the tapered portion 60 as illustrated in FIG. 7. The numeral 66 refers to a tongue element adapted to be received by the tubular member 50 as illustrated in FIG. 7. Tongue member 66 has a hitch portion 68 at its rearward end.

Assuming that the tow bar is in the collapsed position illustrated in FIGS. 2 and 3, the normal method of assembling the same is as follows. The cover element 32 is moved from its closed position to its open position. The tow bar member 46 is then grasped and slidably moved to the right as viewed in FIG. 3 until the tubular member 50 is adjacent the right side of the central openings 28 and 30. The tow bar member 46 is then rotated with respect to the support rod 42 while pivoting the same with respect to the collar 44 so that the tow bar member 46 may be extended rearwardly from the bumper. The tow bar member 48 is also moved from its stored position within the bumper so that it may be extended rearwardly as illustrated in FIG. 7 for detachable connection to the tow bar member 46. A bolt 70 is extended through the ear 56 and through the opening 62 in the tow bar member 48 to provide a rigid connection between the tow bar members 46 and 48. As previously mentioned, the extreme rearward end of the tapered portion 60 of the tow bar member 48 is received by the channel 64 to further stabilize the connection. The tongue member 66 is then removed from the interior of the bumper if it had not already been removed and slidably inserted through the tubular member 50 until it is positioned in the desired position. A bolt 72 is then extended through the opening 52 in the tubular member 50 and through one of the openings 74 formed in the tongue member 66 to effect the connection therebetween. The hitch portion 68 is then secured to the vehicle or implement to be towed. The cover element 32 may be positioned as illustrated in FIG. 6 during the periods that the tow bar is being used. The tow bar 12 is free to rotate or pivot about the support rods 42 and 42' as the tow bar is being used. When it is desired to store the tow bar, it is simply necessary to remove the tongue member 66 from the tubular member 50, disconnect the tow bar members 46 and 48' and reposition the same within the bumper 12. Thus it can be seen that a novel collapsible tow bar has been provided which may be readily moved from a stored position to an operative position. While it is preferred that the collapsible tow bar 12 be employed with a hollow bumper, it should be understood that the collapsible tow bar could be used by supporting structures other than a hollow bumper. While the drawings disclose a pair of support rods 42 and 42', it should be understood that a single rod 42 could extend between the ears 38 and 38'. However, the preferred embodiment is that which is shown in the drawings. Thus it can be seen that the invention accomplishes at least all of its stated objectives.

I claim:

1. A collapsible tow bar for vehicle comprising, a support means operatively secured to the vehicle, a first tow bar member pivotally secured at one end thereof to said support means, a second tow bar member pivotally secured at one end thereof to said support means, said first and second tow bar members being movable from a stored position to a towing position wherein their other ends can be operatively connected, and means at said other ends for connection to another vehicle, said support means comprising first and second spaced apart supports operatively secured to said vehicle, said first and second supports each comprising a horizontally disposed rod, said tow bar members slidably and rotatably mounted on said rods, an enlongated hollow bumper secured to the vehicle, said bumper having front and back wall portions, said first and second supports secured at the interior surface of said back wall portion, said first and second tow bar members stored within said bumper generally parallel to the longitudinal axis of said bumper, said bumper having a central operning formed in its back wall portion to permit the selective rearward extension of said tow bar members therethrough.

2. The tow bar of claim 1 wherein a cover element is secured to said bumper for removably closing said central opening.

3. The tow bar of claim 1 wherein said means at the other ends of said tow bar members comprises a tongue means selectively secured thereto, said tongue means being stored within said bumper when the tow bar is being stored.

4. A collapsible tow bar for a vehicle comprising, a support means operatively secured to the vehicle, a first tow bar member pivotally secured at one end thereof to said support means, a second tow bar member pivotally secured at one end thereof to said support means, said first and second tow bar members being movable from a stored position to a towing position wherein their other ends can be operatively connected, and means at said other ends for connection to another vehicle, said support means comprising first and second spaced apart supports operatively secured to said vehicle, said first and second supports each comprising a horizontally disposed rod, said tow bar members slidably and rotatably mounted on said rods, an elongated bumper secured to the vehicle, said bumper having a compartment formed therein, said supports secured to said bumper within siad compartment, said tow bar members stored in said compartment at times.

* * * * *